United States Patent [19]

Childers

[11] Patent Number: 4,974,888
[45] Date of Patent: Dec. 4, 1990

[54] FASTENING APPARATUS

[75] Inventor: Spencer L. Childers, Clovis, Calif.

[73] Assignee: The Vendo Company, Fresno, Calif.

[21] Appl. No.: 223,804

[22] Filed: Jul. 25, 1988

[51] Int. Cl.⁵ .............................................. E05C 5/04
[52] U.S. Cl. .................................. 292/251; 292/342; 411/433
[58] Field of Search .................... 292/251, 256.63, 33, 292/342, 251; 411/267, 433, 432, 433, 434, 267, 266; 403/314

[56] References Cited

U.S. PATENT DOCUMENTS

| | | | |
|---|---|---|---|
| Re. 31,776 | 12/1984 | Clark et al. | 405/261 |
| 686,391 | 11/1901 | Cox . | |
| 2,166,457 | 7/1939 | Berndt | 403/314 X |
| 2,393,520 | 1/1946 | Crowther | 151/21 |
| 2,814,324 | 11/1957 | Shur | 411/267 |
| 2,896,936 | 7/1959 | Jansen | 85/36 |
| 3,151,652 | 10/1964 | Zahodiakin | 411/267 |
| 3,157,215 | 11/1964 | Zahodiakin | 411/267 |
| 3,352,341 | 11/1967 | Schertz | 151/19 |
| 3,376,638 | 4/1968 | Bjalme et al. | 30/102 |
| 3,550,412 | 12/1970 | Pitel et al. | 292/251 |
| 3,695,139 | 10/1972 | Howe | 85/33 |
| 4,023,431 | 5/1977 | Pavlas | 74/424.8 A |
| 4,045,349 | 8/1977 | Humbert, Jr. | 210/232 |
| 4,071,158 | 1/1978 | Maheu | 220/32 |
| 4,083,393 | 4/1978 | Okada | 411/267 |
| 4,125,140 | 11/1978 | Basile | 151/69 |
| 4,130,335 | 12/1978 | Kinney | 339/122 R |
| 4,174,008 | 11/1979 | Preziosi et al. | 651/69 |
| 4,281,857 | 8/1981 | Randall | 285/34 |
| 4,293,178 | 10/1981 | Lee | 339/103 R |
| 4,295,761 | 10/1981 | Hansen | 411/1 |
| 4,299,520 | 11/1981 | Iwata | 411/437 |
| 4,315,100 | 2/1982 | Haslbeck et al. | 174/51 |
| 4,362,423 | 12/1982 | Miles | 403/39.3 |
| 4,378,187 | 3/1983 | Fullerton | 411/267 |
| 4,405,180 | 9/1983 | Butz | 301/111 |
| 4,428,609 | 1/1984 | Baehr | 292/251 |
| 4,531,872 | 7/1985 | Warkotsh | 411/433 |
| 4,536,112 | 8/1985 | Horsky et al. | 409/134 |
| 4,536,115 | 8/1985 | Helderman | 411/17 |
| 4,547,108 | 10/1985 | Nakama | 411/374 |
| 4,558,494 | 12/1985 | Kraus | 24/297 |
| 4,569,242 | 2/1986 | Hu | 74/424.8 A |
| 4,589,872 | 5/1986 | Bellin et al. | 604/246 |
| 4,618,300 | 10/1986 | Goebel | 411/433 |
| 4,619,568 | 10/1986 | Carstensen | 411/222 |
| 4,646,546 | 3/1987 | Smith | 68/212 |
| 4,653,970 | 3/1987 | Ballantyne | 411/555 |
| 4,684,284 | 8/1987 | Bradley, Jr. | 403/320 |
| 4,693,656 | 9/1987 | Guthrie | 411/433 |
| 4,699,217 | 10/1987 | McLennan et al. | 169/37 |
| 4,709,654 | 12/1987 | Smith | 116/283 |
| 4,756,654 | 7/1988 | Clough | 411/437 |
| 4,764,071 | 8/1988 | Lawrence et al. | 411/433 |
| 4,770,582 | 9/1988 | Junemann et al. | 411/182 |
| 4,781,507 | 11/1988 | Duenas | 411/433 |
| 4,787,794 | 11/1988 | Guthrie | 411/433 |

FOREIGN PATENT DOCUMENTS 834143 8/1938 France .................. 411/433

OTHER PUBLICATIONS

Sales catalogue page and information page of Sanpo Lock Co., Ltd. entitled, "Handle Lock".

Primary Examiner—Richard E. Moore
Attorney, Agent, or Firm—Worrel & Worrel

[57] ABSTRACT

A fastening apparatus operable to secure a pair of work objects to each other and wherein one of the work objects mounts an engagement member, the fastening apparatus having a mount adapted for attachment on the other of said work objects in substantially a predetermined position; and a grasping assembly borne by the mount and operable to expand upon movement of said engagement member therewithin and subsequently to contract for engagement with said engagement member to interlock the work objects.

5 Claims, 4 Drawing Sheets

FIG. 3C

FASTENING APPARATUS

BACKGROUND OF THE INVENTION

1. Field of the Invention

The present invention relates to a fastening apparatus and more particularly to a fastening apparatus adapted for use in a wide variety of operational environments and operable to achieve a rapid and dependable interconnection of a pair of work objects while simultaneously affording the capability for fine adjustment of the work objects relative to each other, the fastening apparatus having particular utility in the closing and sealing of the main doors of vending machines and the like.

2. Description of the Prior Art

There are many situations in which a pair of work objects must be dependably and precisely secured relative to each other and where the speed with which this can be achieved is of operational significance. One such environment in which these observations apply is in the case of the stocking and servicing of vending machines and the like.

Vending machines, by their very nature, must be locked to prevent unauthorized entry and, where the vendable contents are refrigerated, must be sealed to insure that the desired refrigerated environment can be maintained. Thus, in the case of machines for vending soft drinks in metal containers and/or plastic or glass bottles, the main closure or door on the vending machine must be sealed and locked during normal use.

There are, of course, times when the interior compartment of a vending machine must be accessed by authorized personnel. The closure must be opened to check and, as necessary, to replenish the contents of each column of vendables within the vending machine. The money paid into the machine must periodically be collected. The change mechanism within the machine may need to be serviced. The machine may need to be opened if it becomes jammed, or the machine may simply need to be serviced.

Common practice in the operation of vending machines calls for them to be restocked and the income collected from the coin boxes thereof at relatively frequent intervals. The length of the interval depends upon the commercial history of the particular machine involved. In any case, the personnel authorized to open such vending machines are typically on tight schedules servicing a great number of vending machines at widely dispersed locations. Accordingly, such personnel are often disinclined to pay close attention to details not specifically required by their primary responsibilities in servicing the vending machines.

In their hurry to finish with one vending machine and move on to the next, proper attention is often not paid to insuring that the main door of the vending machine is fully closed and sealed. Where a proper seal of the door is not achieved, the necessary refrigerated environment may be difficult or impossible to maintain. External heat may enter the interior of the vending machine at a rate which may require the refrigeration unit to run inordinate periods of time causing wear to the unit and wasting electrical energy. Improper sealing allows warm air to enter and form moisture by condensation which eventually finds its way to the evaporator coil of the refrigeration system. This may cause the coil to be clogged by ice as excessive water collects, thus blocking air flow. This prevents cooling of vendables in the machine. In other instances, it may be impossible for the refrigeration unit to maintain the desired temperature. In such instances the vendables may not be sufficiently cold to be appealing to customers leading to a loss of sales. In the most aggravated cases, of course, certain vendables may be damaged by a lack of adequate refrigeration.

The likelihood that a proper seal will not be achieved is increased by the fact that in order to accomplish a proper seal, the securing mechanism must be rotated a substantial number of times. Such securing mechanisms conventionally employed consist of a screw threaded bolt which is threaded into an internally screw threaded nut or the like. Because the sealing material itself is typically a rather substantial rib of synthetic rubber material running entirely around the opening which the door covers, considerable force must be applied in compressing the rib to the degree necessary to accomplish the desired seal. This can, as a practical matter, be best achieved through the mechanical advantage obtained through the use of a screw threaded bolt. The bolt, thus, must be turned in a number of complete revolutions to achieve the proper compression and seal. The bolt type lock system has also been shown to provide a high degree of security against vandalism and break in. Yet it is simple and of relatively low cost compared to other locking systems known to the art.

As a consequence, servicing personnel frequently turn the securing bolt only the number of turns necessary to place the rib of the door in contact with the housing of the vending machine and not the additional number of rotations required to compress the rib enough to achieve the optimum seal. The unsatisfactory consequences of this failure previously set forth are too often the result.

Therefore, it has long been known that it would be desirable to have a fastening apparatus having application to the rapid and dependable interconnection of work objects of a variety of types having particular utility in the closing and sealing of the main doors of vending machines and the like which affords the mechanical advantage necessary to achieve the optimum seal, but which can be operated in a small fraction of the time and with a small fraction of the amount of effort required by conventional fastening mechanism; which assists in assuring that the doors of vending machines when closed are sealed in the optimum manner; which minimizes the amount of waste of electrical energy, wear of equipment and damage or inadequate refrigeration of vendables attendant to conventional operations; and which is durable, dependable and fully capable of operating as otherwise required.

SUMMARY OF THE INVENTION

Therefore, it is an object of the invention to provide an improved fastening apparatus.

Another object is to provide such a fastening apparatus which can be operated rapidly and dependably to secure a pair of work objects to each other.

Another object is to provide such a fastening apparatus which is adaptable for use in a wide variety of operative environments achieving all of the operative benefits attendant thereto.

Another object is to provide such a fastening apparatus which is particularly well suited to securing and sealing the main closures of vending machines and the like wherein mechanical advantage must be achieved in drawing the closure into a fully sealed condition relative to the vending machine.

Another object is to provide such a fastening apparatus wherein force in an axial direction applied in closing the closure is received by the fastening apparatus in such a manner as to accelerate the sealing operation.

Another object is to provide such a fastening apparatus which substantially reduces the amount of time and effort required for service personnel to close and seal vending machines and the like thereby substantially increasing the likelihood that such service personnel will properly close and seal such machines.

Another object is to provide such a fastening apparatus which operates to insure that waste of electrical energy, wearing of components and loss of sales or product damage resulting from inadequate refrigeration of the vendables is minimized in the operation of vending machines.

Another object is to provide such a fastening apparatus which assures a high degree of security found with other conventional bolt type closures.

Another object is to provide such a fastening apparatus which possesses all of the mechanical advantage obtained in a screw threaded fastening assembly while possessing the advantages attendant to the operation of a quick lock type of fastening assembly.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 2:
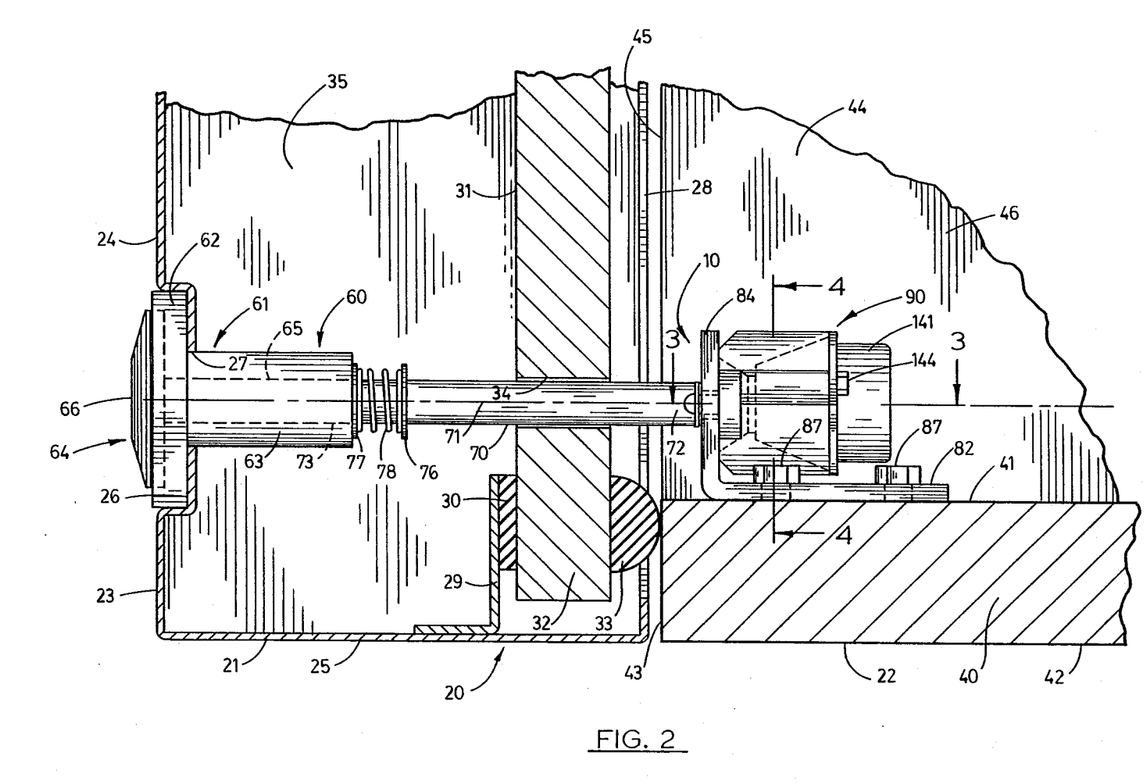
FIG. 2 is a fragmentary horizontal section of a portion of a closure and case of a vending machine mounting the fastening apparatus of the present invention.

Referring with greater particularity to the drawings, the fastening apparatus of the present invention is generally indicated by the numeral 10 in FIG. 2. The fastening apparatus is shown in FIG. 2 in a representative operative environment mounted on a vending machine 20. As will become more clearly apparent, the fastening apparatus of the present invention can be employed in a wide variety of operative environments where two work objects are to be secured to each other. The vending machine 20 is merely representative of one such operative environment.

The vending machine 20 is shown fragmentarily in FIG. 2 in horizontal section and has a closure or door 21 and a case or housing 22. The door has an outer shell 23 with a face or front wall 24 and a side wall 25 which extends about the perimeter of the door. The front wall has a recess 26 in a predetermined location which communicates with a passage 27. The side wall of the outer shell bounds an opening 28 extending over substantially the entire back surface of the door 21. A stop 29 is mounted on the side wall 25 within the outer shell 23 extending entirely about the interior of the door. A seal 30 of resilient material is affixed on the stop also extending entirely about the interior of the door.

The door 21 mounts an inner door 31 which, by means not shown, moves with the door 21, but can be pivoted to and from the seal 30 and through the opening 28 when desired if the door 21 is open. The inner door 31 has a perimeter portion 32 and mounts a main rib or seal 33 extending entirely about the perimeter portion of the inner door and so positioned as to extend through the opening 28 defined by the side wall 25 of the outer shell 23. A bore 34 extends through the inner door 31 in a predetermined position. The outer shell 23 and inner door 31, when the inner door is in the closed position shown in FIG. 2, define an interior compartment for the door 21.

The housing 22 of the vending machine 20 has a side wall 40 having an interior surface 41 and an exterior surface 42. The side wall 40 has a front surface 43. The housing 22 has a floor 44. The side wall, floor and other walls of the housing define a front opening 45 for the housing communicating with an interior 46 thereof.

An engagement or securing bolt assembly is generally indicated by the numeral 60 in FIG. 2. In order to operate, the fastening apparatus 10 of the present invention requires the use of a member to grasp. However, the structure of the member with which the grasping assembly can operate can vary substantially. In the operative environment of the vending machine 20 shown in FIG. 2, a conventional securing bolt assembly typical of those used in vending machines is shown. The securing bolt assembly has a lock assembly 61 of conventional construction including a head portion 62 mounted in the recess 26 of the door 21 and a barrel portion 63 which extends through the passage 27 and into the interior compartment 35. The lock assembly has a handle portion 64 slidably received in the barrel portion and consisting of a shaft 65 and a key receiving portion 66.

The securing bolt assembly 60 has an engagement member or securing bolt 70 having a longitudinal axis 71. The securing bolt has a distal end portion 72 and an opposite proximal end portion 73 which is mounted for rotational movement in the barrel portion 63 of the lock assembly. The shaft 65 of the handle portion of the lock assembly is slidable relative to the securing bolt by a spline interconnection, not shown. Standard male screw threads 74 are inscribed about the distal end portion 72. The distal end portion mounts a tapered probe 75.

The lock assembly 61, of conventional construction, operates in the conventional manner. The operator inserts the appropriate key into the key receiving portion 66 and turns it to release the handle portion. The handle portion is moved out of the lock assembly by operation of an internal compression spring, not shown, a sufficient distance so that the handle portion 64 can be grasped by the operator. Such outward movement of the handle portion so interconnects the shaft 65 and the securing bolt through operation of the spline, not shown, that turning of the handle rotates the securing bolt about the longitudinal axis 71. Conversely, when the handle portion is pushed into the lock assembly to the position shown in FIG. 2, it again locks in place and turning of the handle portion no longer achieves rotation of the securing bolt.

A flange 76 is mounted in fixed relation on the securing bolt in the predetermined position shown in FIG. 2. A washer 77 is received rotationally about the securing bolt against the barrel portion 63 of the lock assembly 61. A compression spring 78 is captured between the washer and the flange which simply serves to cushion any impact encountered by the securing bolt such as in opening and closing the door 21 or inner door 31.

The fastening apparatus 10 has a mount or bracket 80 adapted to be mounted on the interior surface 41 of the side wall 40 of the housing 22. As best shown in FIGS. 3A, 3B, 3C and 4, the side wall 40 has four internally screw threaded bores 81 extending into the side wall in predetermined locations. The bracket has a substantially flat face plate 82 having four bolt holes 83 extending therethrough in positions corresponding to the positions of the screw threaded bores 81. The bracket has a substantially flat mounting plate 84 mounted thereon substantially at right angles thereto, as best shown in FIG. 2. The mounting plate has two oversize holes 85 extending therethrough in predetermined spaced positions. A control passage 86 extends through the mounting plate between the oversize holes 85.

The bracket 80 is mounted on the interior surface 41 of the side wall 40 by four bolts 87 individually extending through the bolt holes 83 of the face plate 82 and screw threadably secured in the screw threaded bores 81. The bracket is thus mounted in the attitude and position shown in FIG. 2.

Figure 1:
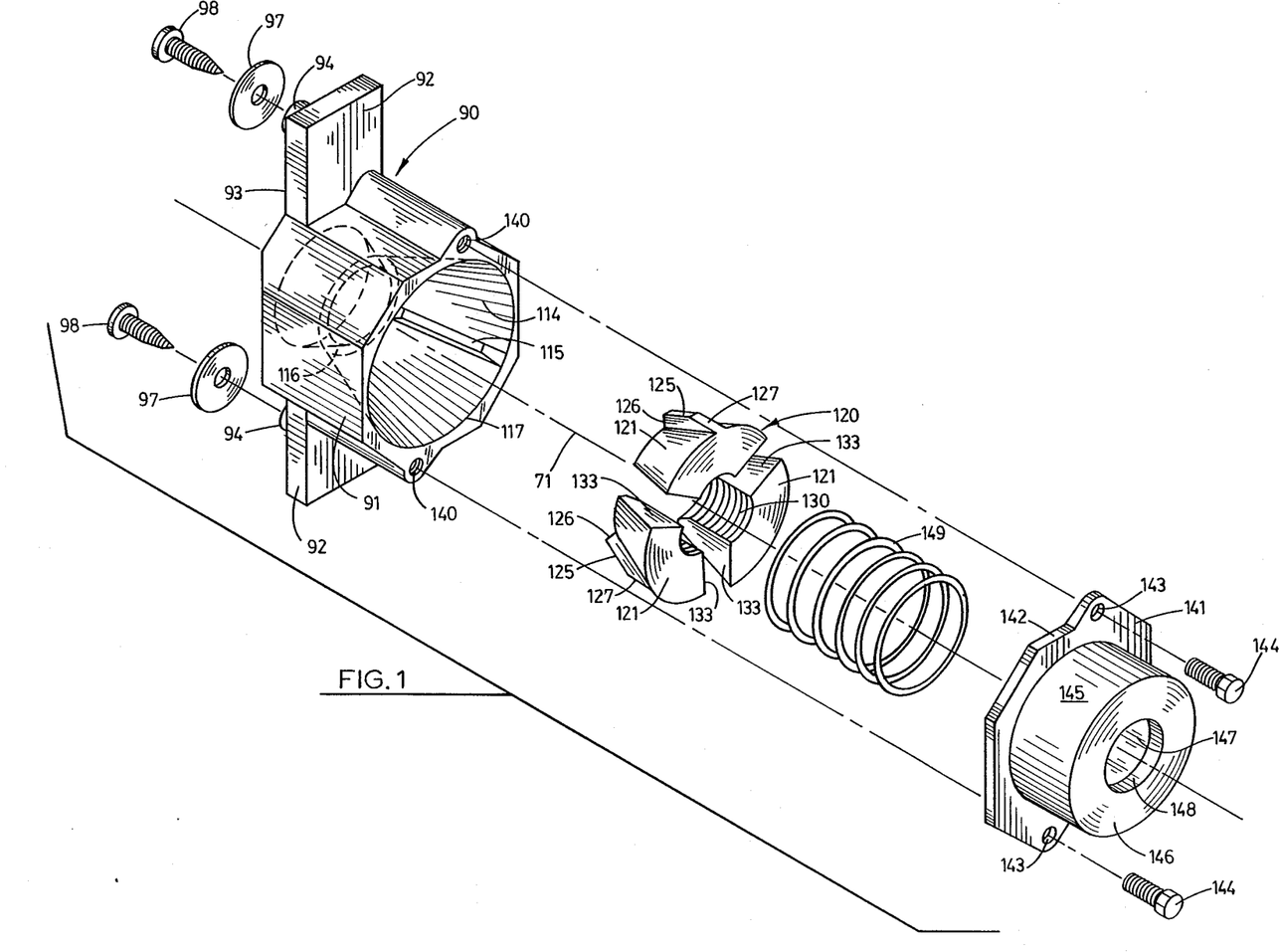
FIG. 1 is a perspective exploded view of the grasping assembly of the fastening apparatus of the present invention.

The fastening apparatus 10 has a grasping assembly 90 shown in exploded perspective view in FIG. 1. The grasping assembly has a housing 91 with laterally extending flanges 92. The housing and the lateral flanges thereof have a substantially flat front surface 93 from which a pair of substantially cylindrical bosses 94 are extended in positions adapted to mate with the oversize holes 85 in the mounting plate 84 of the bracket 80. The bosses have internally screw threaded bores 95. The housing is mounted on the mounting plate with the bosses 94 individually extended through the oversize holes 85 with the flat front surface 93 in facing engagement with the mounting plate. The length of the bosses is such that the terminal ends 96 thereof extend just beyond the opposite surface of the mounting plate. The external diameter of the bosses is smaller than the internal diameters of the oversize holes so that the bosses, and therefore the housing, is permitted limited movement laterally on the mounting plate a full 360 degrees.

The housing 91 and bosses 94 are retained in the described positions by washers 97, having external diameters greater than the interior diameters of the oversize holes 85, and are retained on the terminal ends of the bosses by screws 98 individually extending through the washers and screw threadably secured in the screw threaded bores 95. Thus, because of the greater length of the bosses relative to the thickness of the mounting plate 84 and the smaller diameters of the bosses relative to the oversize holes, the grasping assembly can move laterally on the mounting plate to a degree limited by the "play" thereby afforded.

Figure 3A:
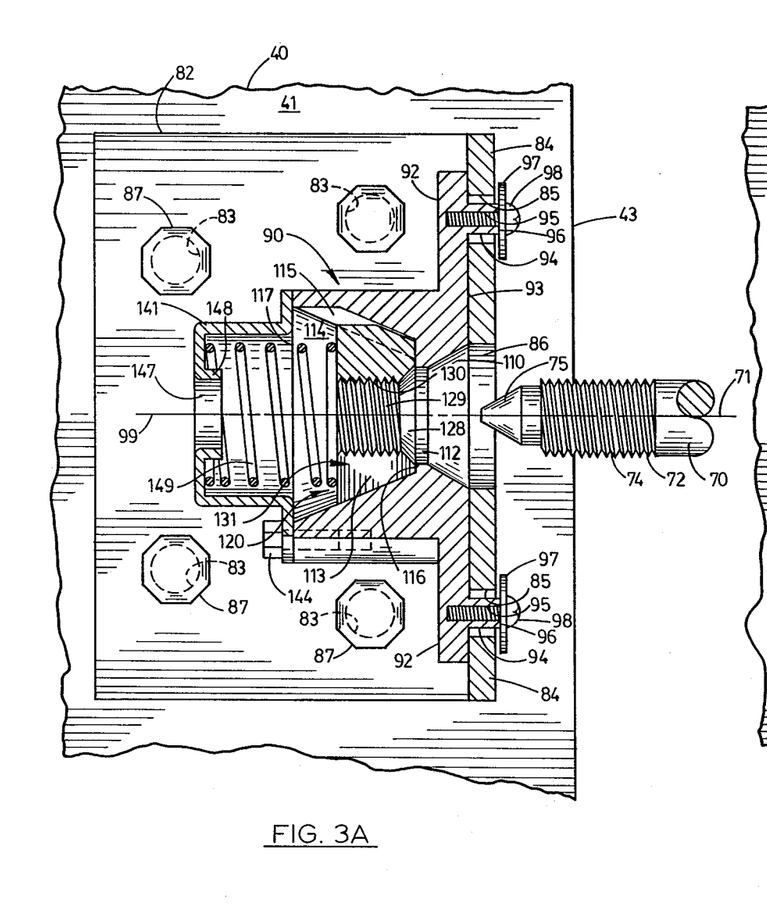
FIG. 3 is a somewhat enlarged, longitudinal vertical section taken from a position indicated by line 3—3 in FIG. 2 and fragmentarily showing the securing bolt aligned with and spaced from the grasping assembly of the fastening apparatus.
Figure 3B:
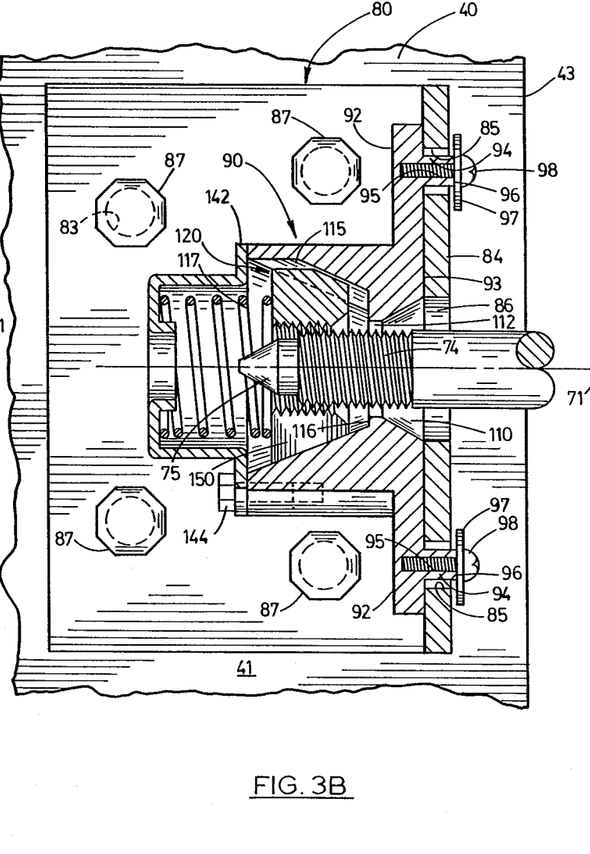
FIG. 3B is a somewhat enlarged, longitudinal vertical section taken from a position indicated by line 3—3 in FIG. 2 and fragmentarily showing the securing bolt during movement into the grasping assembly driving the grasping segments farther inwardly of the grasping assembly and from each other.
Figure 3C:
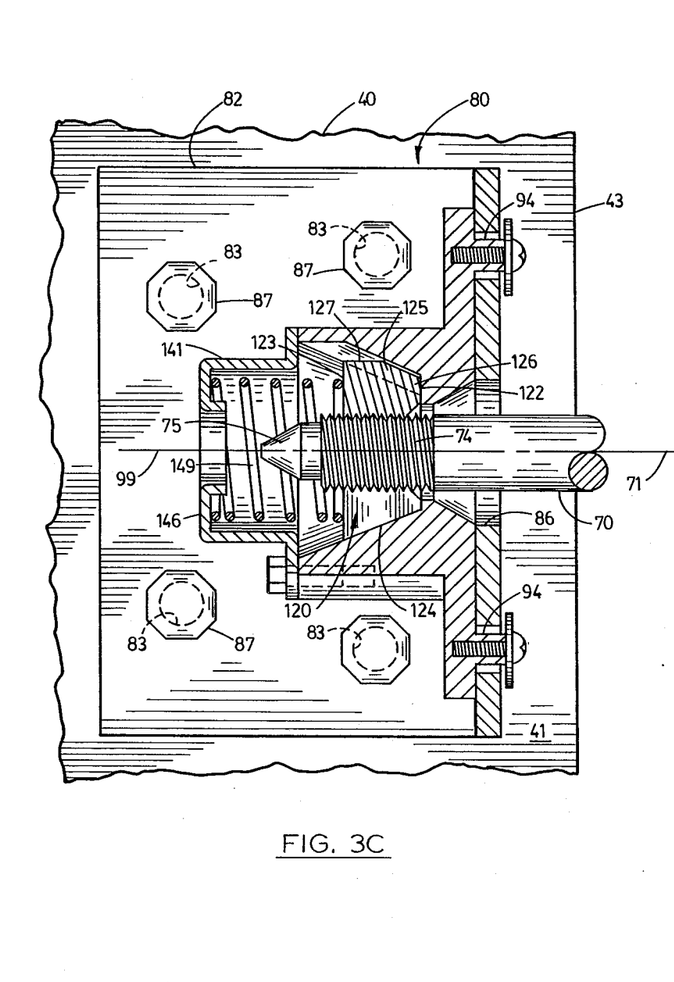
FIG. 3C is a somewhat enlarged, longitudinal vertical section taken from a position indicated by line 3—3 in FIG.. 2 and fragmentarily showing the securing bolt fully engaged by the grasping assembly with the grasping segments engaging the screw threads thereof.
Figure 4:
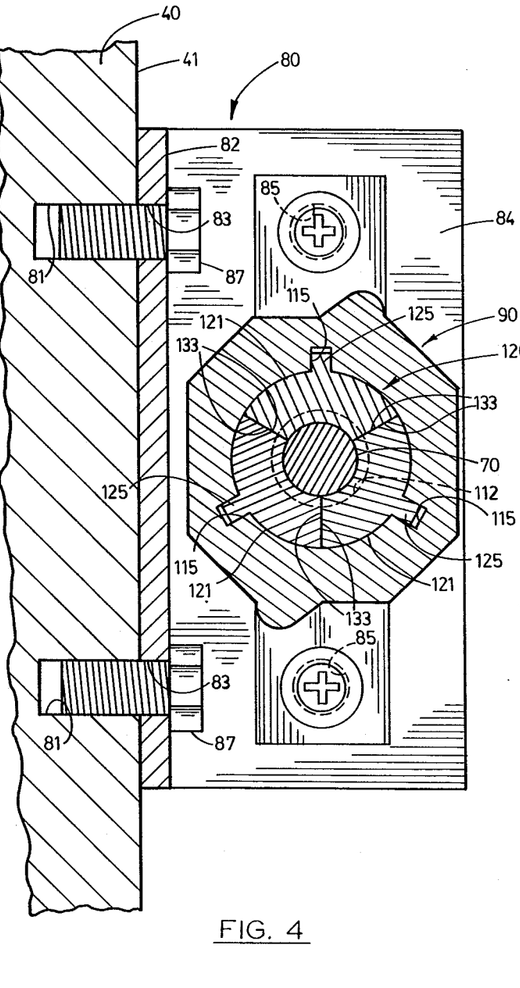
FIG. 4 is a somewhat enlarged, transverse vertical section taken from a position indicated by line 4—4 in FIG. 2 and showing the securing bolt fully engaged by the grasping assembly.

The housing 91 has a longitudinal axis 99. The housing has a contact surface or mouth 110 of a substantially frustoconical configuration communicating with the central passage 86 of the mounting plate 84. The "play" permitted by the bosses 94 and oversize holes 85 previously described is such that communication between the central passage 86 and the mouth 110 is maintained. The mouth converges upon an opening 112 which in turn communicates with a chamber 113, as can best be seen in FIGS. 3A, 3B and 3C. The chamber is defined by a substantially frustoconical or cam surface 114 having three guide slots 115 therein. As can best be seen in FIG. 4, the guide slots are spaced from each other substantially 120 degrees about the longitudinal axis 99 of the housing. As best shown in FIGS. 3A, 3B and 3C, the guide slots extend from a proximal wall 116 adjacent to the opening 112 to a terminal edge 117 of the chamber 113.

Mounted within the housing 91 of the grasping assembly 90 is female assembly 120 composed of three grasping members or segments 121. As will subsequently be described, the female assembly is adapted for movement within the chamber of the housing and the grasping segments composing the female assembly are adapted for controlled movement relative to each other.

When the female assembly 120 and the grasping segments 121 thereof are in the position shown in FIGS. 3A and 3C, the female assembly may be viewed as having a front surface 122 and an opposite rear surface 123. Similarly, the female assembly has a substantially frustoconical outer surface 124 which, in the position shown in FIGS. 3A and 3C, is disposed in substantially facing relation with the frustoconical surface 114 of the housing. Three ridges 125 are mounted on and extend outwardly from the outer surface 124. The ridges are spaced 120 degrees from each other about the outer surface and are individually received in sliding relation in the guide slots 115 of the cam surface 114. As can best be seen in FIG. 4, one of the ridges extends outwardly from each of the grasping segments. Each of the ridges has a leading end 126 and an opposite trailing end 127.

The female assembly 120, in the positions shown in FIGS. 3A and 3C, has a frustoconical strike surface 128 extending convergently inwardly from the front surface 122 and communicating with a passage 129 substantially concentric to the longitudinal axis 99 of the housing and bounded by female screw threads 130.

The female assembly 120, received in the housing 91 as described, is adapted for movement between a first position 131, which is the position shown in FIGS. 3A and 3C, and a second position, not shown, wherein the trailing ends 127 of the ridges 125 and the rear surface 123 of the female assembly are immediately adjacent to the terminal edge 117 of the housing 91. Each of the grasping segments 121 has lateral shoulder portions 133 which, in the first position 131 of the female assembly, individually facingly engage the lateral shoulder portions of adjacent grasping segments.

The housing 91 has a pair of screw threaded bores 140 extending inwardly of the housing from the terminal edge 117 on opposite sides of the chamber 113 as can best be seen in FIG. 1. A removable closure 141 is mounted on the terminal edge of the housing. The closure has a lateral flange 142 having a pair of bolt holes 143 extended therethrough in positions matching the positions of the screw threaded bores 140. The closure is mounted on the housing by bolts 144 individually extending through the bolt holes 143 and screw threadably secured in the screw threaded bores. The closure has a cylindrical portion 145 having a backwall 146. The backwall has an opening 147 therein communicating with the interior of the housing and bounded by an inwardly directed interior lip 148.

A compression spring 149 is positioned in the housing 91 captured between the backwall 146 of the closure 141 and extending about the lip 148 and the rear surface 123 of the female assembly 120. The strength of the compression spring is such as resiliently to retain the grasping segments 121 and thus the female assembly 120 in the first position 131 shown in FIGS. 3A and 3C. The compression spring operates in most instances to prevent the female assembly, in being moved from the first position during operation of the fastening apparatus 10, from reaching the second position. More commonly, the maximum distance of movement of the female assembly from the first position is the intermediate position 150 shown in FIG. 3B. This, of course, depends upon the amount of force applied by the operator.

OPERATION

The operation of the described embodiment of the subject invention is believed to be clearly apparent and is briefly summarized at this point.

A vending machine 20, mounting the fastening apparatus 10 of the present invention, may require opening for a variety of reasons. The most common reason for opening the vending machine, of course, is to check the quantities of vendables in each column in the vending machine and to replenish those columns requiring such restocking. However, there are many other reasons for opening vending machines such as servicing, repair, collecting from the coin box and the like.

Where such opening is required, the person seeking entry must have the required key in order to operate the lock assembly 61. As previously described, the key is inserted into the key receiving portion 66 of the lock assembly and turned to release the handle portion 64 for grasping by the operator. The securing bolt 70 is at this time screw threadably received in the grasping assembly 90 substantially as shown in FIG. 3C. Turning of the handle portion in a counterclockwise direction rotates the securing bolt, similarly, in a counterclockwise direction about its longitudinal axis 71. The rebounding from compression of the main seal 33 and the weight of the door, without more, causes some outward pull on the securing bolt and thus keeps the threads engaged in such a manner as to allow continued unthreading. In those operative environments where there is no seal and the weight of the door may not be very great, such as in non-insulated cabinets, slight outward pulling on the handle portion will accomplish the same purpose.

Such turning of the handle portion 64 is continued until the male screw threads 74 of the securing bolt completely unthread themselves from the female screw threads 130 of the female assembly 120. The female assembly 120 stays in the first position 131 as shown in FIG. 3C unless the operator were to push the door and thus the securing bolt back inwardly of the grasping assembly 90.

When unthreading of the securing bolt 70 from the female assembly 120 has been achieved, the door 21 is simply pulled open from the housing 22 withdrawing the securing bolt 70 from the grasping assembly 90. If entry to the interior compartment 35 between the outer shell 23 and the inner door 31 is required, the inner door is simply pivoted away from the main seal 30 thus withdrawing the inner door from about the securing bolt. This exposes the interior compartment. In any case, the operator at this time performs whatever tasks required opening of the vending machine.

When these tasks have been completed and it is again time to close, seal and lock the door 21 in the closed position, the operator simply moves the door into the closed position shown in FIG. 2. While normally this will be done with moderate force, the door could literally be slammed shut by the operator. The fastening apparatus 10 works with equal dependability in either case.

As the door 21 is moved to the closed position, the distal end portion 72 of the securing bolt 70 approaches the grasping assembly 90 as shown in FIG. 3A. For illustrative convenience, the securing bolt and the grasping assembly are shown as precisely aligned in FIG. 3A. Thus, as shown therein, the longitudinal axis 71 of the securing bolt is coincident with the longitudinal axis 99 of the housing 91. However, as previously discussed, the grasping assembly 90 can move laterally to a limited extent on the mounting plate 84. Thus, the longitudinal axes of the securing bolt and the housing 91 may not, and need not, be precisely aligned as the securing bolt enters the grasping assembly. Initial contact between the distal end portion 72 of the securing bolt and the grasping assembly automatically causes the grasping assembly to be moved laterally to the extent necessary to place the longitudinal axis of the housing in coincidence with the longitudinal axis of the securing bolt. Since, depending upon the particular structure mounting the securing bolt, the distal end portion 72 of the securing bolt may be laterally movable to a limited degree, the alignment of the grasping assembly and the securing bolt may involve some lateral adjustment of each.

Referring again to FIG. 3A, the distal end portion 72 of the securing bolt 70 passes through the central passage 86 of the mounting plate 84, the mouth 110 of the housing 91, the opening 112 of the housing and into the passage 129 of the female assembly 120. During such movement, the tapered probe 75 or the male screw threads 74 may contact the mouth 110, opening 112 and/or the strike surface 128. When this occurs, the lateral adjustment of the grasping assembly and the securing bolt previously described takes place to position the longitudinal axis 71 of the securing bolt 70 in coincidence with the longitudinal axis 99 of the grasping assembly. Similarly, the contact of the male screw threads 74 with the female screw threads 130 achieves such alignment.

Since the male screw threads 74 are dimensioned screw threadably to engage the female screw threads 130 when the female assembly 120 is in the first position 131, even where the securing bolt 70 and grasping assembly 90 are precisely aligned prior to any contact between the two, the respective screw threads contact each other. Accordingly, there is always contact by the distal end portion 72 of the securing bolt with the female assembly 120 as the securing bolt moves into the grasping assembly. This causes not only the alignment of the two as previously described, but also causes the grasping segments 121 comprising the female assembly to be driven from the first position inwardly of the chamber 113 and from each other as permitted by the cam surface 114. The ridges 125 slide during such movement in the guide slots 115 thereby preventing them from rotating during bolt rotation and insuring that the grasping segments do not become jammed. The compression spring 149 allows the grasping segments to move from the first position only so far as required to admit the male screw threads fully within the passage 129. Movement of the grasping segments from each other and from the first position is illustrated in FIG. 3B. The greater the force applied in closing the door 21 or the longer the force is applied in closing the door, the farther the male screw threads of the securing bolt will be received in the passage 129. Since the objective in use of the fastening apparatus 10 of the present invention is to achieve dependable and secure sealing of the door 21 on the housing 22 of the vending machine 20 as quickly as possible, moderately forceful closing of the door may be preferred. No damage will be attendant to such closing of the door.

In any case, when the distal end portion 72 of the securing bolt 70 has reached the position shown in FIG. 3C, the seal 33 of the inner door 31 will have contacted the front surface 43 of the housing 22. This, of course, terminates further forward movement of the securing bolt within the passage 129. The compression spring 149 causes the grasping segments 121 again to be returned to the first position 131. During such movement, the cam surface 114 forces the grasping segments, together until the lateral shoulder portions 133 of adjoining grasping segments seat against each other. This similarly causes the male screw threads 74 and the female screw threads 130 to seat in each other as shown in FIG. 3C. When this has occurred, the securing bolt is fully screw threadable in the female assembly 120 of the grasping assembly.

The operator then turns the handle portion 64 of the securing bolt assembly 60 about the longitudinal axis 71 of the securing bolt as necessary to achieve the desired compression, and thus seal, of the main seal 33 with the front surface 43 of the housing 22. Normally this requires only a portion of a turn about the longitudinal axis. It is possible, particularly if steady pressure is applied in closing the door, that no turning of the handle portion, and thereby the securing bolt, will be required to achieve the desired seal. However, normally a portion of a turn is applied if only to insure that the desired seal has been achieved.

Therefore, the fastening apparatus of the present invention has application to the rapid and dependable interconnection of work objects of a variety of types having particular utility in the closing and sealing of the main doors of vending machines and the like which affords the mechanical advantage necessary to achieve the optimum seal, but which can be operated in a small fraction of the time and with a small fraction of the effort required by conventional fastening mechanisms; which assists in assuring that the doors of vending machines when closed are sealed in the optimum manner; which minimizes the amount of waste of electrical energy, wearing of equipment and damage or inadequate refrigeration of vendables attendant to conventional operation; and which is durable, dependable and fully capable of operating as otherwise required, with a high degree of security.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A fastening apparatus operable releasably to secure a closure in a closed position on the case of a vending machine or the like, the fastening apparatus comprising:
  A. a securing bolt having a longitudinal axis and adapted to be mounted on the closure for substantially rotational movement about said longitudinal axis and having a distal end portion about which are formed male screw threads;
  B. a bracket, having at least one hole therein adapted to be mounted on the case of the vending machine in substantial alignment with the position of the distal end portion of the securing bolt when the closure is in said closed position;
  C. a housing mounted on the bracket having an entry surface convergent upon an opening communicating with an internal chamber within the housing, said chamber bounded by a cam surface convergent in the direction of said opening and said housing having at least one boss of sufficiently smaller diameter than said hole of the bracket to extend through said hole and permit lateral movement of the housing on the bracket and attachment means secured on the distal end of the boss to prevent said boss from being drawn outwardly through said hole;
  D. three grasping segments received in the chamber of the housing, each of said segments being transversely arcuate and having lateral shoulder portions, said segments being positionable in a first position with said segments transversely forming a substantially circular configuration with the lateral shoulders of adjacent segments in juxtaposition forming a passage therethrough in substantial alignment with said opening of the housing and said segments having outer surfaces convergent in the direction of said opening and in juxtaposition to the cam surface of the housing and inner surfaces which in said first position match to form female screw threads bounding said passage; and
  E. a compression spring captured in the housing in engagement with said segments resiliently to retain said segments in the first position whereby when the closure is moved to said closed position the securing bolt passes through said opening and into the passage formed by the segments in said first position to force said segments inwardly of the housing from the first position and from each other along the cam surface to penetrate the passage and said compression spring urges the female screw threads thereof into screw threadable engagement with said male screw threads of the securing bolt.

2. A fastening apparatus operable to secure a pair of work objects to each other and wherein one of the work objects mounts an engagement member deployed for interlocking said work objects in a conventional configuration, the fastening apparatus comprising:
  A. a housing adapted to be mounted on the other of said pair of work objects substantially in a predetermined position and having an opening, a chamber communicating with said opening bounded by a substantially frustoconically shaped cam surface convergent upon said opening and a strike surface deployed on the housing on the opposite said of the opening from said cam surface and converging upon the opening in substantial alignment with the cam surface;

B. mounting means for mounting the housing on its respective work object including at least one projection and at least one hole through which said projection extends and wherein said projection is smaller in cross section than said hole to permit lateral movement of the housing on its respective work object;

C. at least two grasping members captured in the chamber of the housing having outer surfaces convergent in the direction of said opening of the housing and in juxtaposition to the cam surface of the housing for movement between a first position in proximal relation to each other and adjacent to said opening of the housing and a second position spaced from each other and from said opening of the housing; and D. means mounted in the housing for resiliently urging the grasping members toward said first position, whereby said work objects can be moved together relative to each other to drive said engagement member into said opening of the housing, as guided as necessary by contact with the strike surface of the housing, and against the grasping members driving the grasping members toward said second position to admit the engagement member between the grasping members, said urging means subsequently urging the grasping members toward the first position to grasp the engagement member so as to secure the work objects together and said lateral movement of the housing, as permitted by said mounting means, permits the engagement member and the grasping members to self align with each other.

3. A fastening apparatus operable to secure a pair of work objects to each other and wherein one of the work objects mounts an engagement member deployed for interlocking said work objects in a conventional configuration, the fastening apparatus comprising:

A. a housing adapted to be mounted on the other of said pair of work objects substantially in a predetermined position and having an opening, a chamber communicating with said opening bounded by a substantially frustoconically shaped cam surface convergent upon said opening and a strike surface deployed on the housing on the opposite side of the opening from said cam surface and converging upon the opening in substantial alignment with the cam surface, said housing having a backwall with a lip extending inwardly of the housing;

B. at least two grasping members captured in the chamber of the housing having outer surfaces convergent in the direction of said opening of the housing and in juxtaposition to the cam surface of the housing for movement between a first position in proximal relation to each other and adjacent to said opening of the housing and a second position spaced from each other and from said opening of the housing; and C. a compression spring captured in the housing between the grasping members and the backwall of the housing for resiliently urging the grasping members toward said first position, whereby said work objects can be moved together relative to each other to drive said engagement member into said opening of the housing, as guided as necessary by contact with the strike surface of the housing, and against the grasping members driving the grasping members toward said second position to admit the engagement member between the grasping members and said compression spring subsequently urges the grasping members toward the first position to grasp the engagement member so as to secure the work objects together and the lip of the backwall of the housing extends inwardly of the housing internally of the compression spring to retain said compression spring in position in the housing.

4. In a vending machine or the like having a case, a closure mounted on the case for movement to and from a closed position, a securing bolt mounted on the closure, a fastening apparatus comprising a grasping assembly operable releasably to grasp said securing bolt for retaining the closure in said closed position on the case; and means for mounting the grasping assembly on the case in substantial alignment with the securing bolt in said closed position including at least one projection and at least one hole through which said projection extends and wherein said projection is smaller in cross section than said hole to permit lateral movement of the grasping assembly on the case so that as the closure is moved to the closed position, lateral movement of the grasping assembly permits the securing bolt and grasping assembly to align with each other as the securing bolt is grasped by the grasping assembly.

5. The fastening apparatus of claim 4 wherein the grasping assembly has an opening through which the securing bolt extends when grasped by said grasping assembly and the grasping assembly has a strike surface facing in a direction for contact by the securing bolt and converging upon said opening.

* * * * *

UNITED STATES PATENT AND TRADEMARK OFFICE
CERTIFICATE OF CORRECTION

PATENT NO. : 4,974,888

DATED : December 4, 1990

INVENTOR(S) : Spencer L. Childers

It is certified that error appears in the above-identified patent and that said Letters Patent is hereby corrected as shown below:

Column 10, Line 67
Delete the word "said" and insert the word --side--.

Signed and Sealed this

Nineteenth Day of May, 1992

Attest:

DOUGLAS B. COMER

*Attesting Officer*    *Acting Commissioner of Patents and Trademarks*